United States Patent
Olofsson et al.

(10) Patent No.: US 12,052,569 B2
(45) Date of Patent: *Jul. 30, 2024

(54) SYSTEMS AND METHODS FOR DISTRIBUTING SD-WAN POLICIES

(71) Applicant: Cisco Technology Inc., San Jose, CA (US)

(72) Inventors: Stefan Olofsson, Dubai (AE); Ijsbrand Wijnands, Leuven (BE); Hendrikus G. P. Bosch, Aalsmeer (NL); Jeffrey Napper, Delft (NL); Anubhav Gupta, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 338 days.

This patent is subject to a terminal disclaimer.

(21) Appl. No.: 17/403,676

(22) Filed: Aug. 16, 2021

(65) Prior Publication Data

US 2021/0369309 A1    Dec. 2, 2021

Related U.S. Application Data

(63) Continuation of application No. 16/574,963, filed on Sep. 18, 2019, now Pat. No. 11,129,023.

(Continued)

(51) Int. Cl.
*H04W 12/086* (2021.01)
*H04L 9/40* (2022.01)
(Continued)

(52) U.S. Cl.
CPC ....... *H04W 12/086* (2021.01); *H04L 63/0272* (2013.01); *H04L 63/20* (2013.01); *H04W 12/37* (2021.01); *H04L 45/64* (2013.01)

(58) Field of Classification Search
CPC ....... H04L 43/08; H04L 45/64; H04L 41/145; H04L 41/147; H04L 41/5009;
(Continued)

(56) References Cited

U.S. PATENT DOCUMENTS 7,505,397 B2  3/2009  Lee et al.
7,636,793 B1  12/2009  Friedman
(Continued)

FOREIGN PATENT DOCUMENTS

CN  107276897 A  10/2017
CN  108964985 A  12/2018
(Continued)

OTHER PUBLICATIONS

Chinese Office Action corresponding to Chinese Patent Application No. 202080048762.2, dated Nov. 8, 2022, 9 pages.
(Continued)

*Primary Examiner* — Matthew C Sams
(74) *Attorney, Agent, or Firm* — Baker Botts L.L.P.

(57) ABSTRACT

In one embodiment, a router includes one or more processors and one or more computer-readable non-transitory storage media coupled to the one or more processors. The one or more computer-readable non-transitory storage media include instructions that, when executed by the one or more processors, cause the router to perform operations including receiving software-defined networking in a wide area network (SD-WAN) policies from a component of an SD-WAN network. The operations also include establishing a session with a mobile device and receiving information associated with the mobile device in response to establishing the session with the mobile device. The operations further include filtering the SD-WAN policies based on the information associated with the mobile device to generate SD-
(Continued)

WAN device-specific policies and communicating the SD-WAN device-specific policies to the mobile device.

20 Claims, 6 Drawing Sheets

Related U.S. Application Data

(60) Provisional application No. 62/858,136, filed on Jun. 6, 2019.

(51) Int. Cl.
*H04L 45/64* (2022.01)
*H04W 12/37* (2021.01)

(58) Field of Classification Search
CPC . H04L 1/0003; H04L 47/365; H04L 41/0813; H04L 12/4633; H04W 24/02; H04W 28/18; H04W 76/25
See application file for complete search history.

(56) References Cited

U.S. PATENT DOCUMENTS

| | | | | |
|---|---|---|---|---|
| 8,910,239 | B2* | 12/2014 | Barton | H04L 63/029 |
| | | | | 726/4 |
| 11,129,023 | B2* | 9/2021 | Olofsson | H04L 63/20 |
| 11,336,482 | B2* | 5/2022 | Ramamoorthi | H04L 41/0894 |
| 11,563,601 | B1* | 1/2023 | K S | H04L 41/0816 |
| 2004/0215978 | A1* | 10/2004 | Okajo | H04L 63/0227 |
| | | | | 726/1 |
| 2014/0109174 | A1 | 4/2014 | Barton et al. | |
| 2015/0109987 | A1 | 4/2015 | Wang et al. | |
| 2016/0330075 | A1 | 11/2016 | Tiwari et al. | |
| 2016/0344635 | A1* | 11/2016 | Lee | H04L 47/20 |
| 2017/0111233 | A1 | 4/2017 | Kokkula et al. | |
| 2017/0279710 | A1 | 9/2017 | Khan et al. | |
| 2019/0158676 | A1 | 5/2019 | Shaw et al. | |
| 2019/0274070 | A1 | 9/2019 | Hughes et al. | |
| 2019/0334820 | A1 | 10/2019 | Zhao | |
| 2020/0153701 | A1 | 5/2020 | Mohan et al. | |
| 2020/0389457 | A1* | 12/2020 | Olofsson | H04L 45/64 |
| 2020/0389796 | A1* | 12/2020 | Olofsson | H04L 63/20 |

FOREIGN PATENT DOCUMENTS

| | | |
|---|---|---|
| CN | 109309621 A | 2/2019 |
| CN | 109921944 A | 6/2019 |
| JP | 2004342072 A | 12/2004 |
| JP | 2015153399 A | 8/2015 |
| JP | 2018517352 A | 6/2018 |
| WO | 2016038611 A1 | 3/2016 |

OTHER PUBLICATIONS

Xie Zhao-xian, et al. "Architecture and Research Overview of the Software Defined Wide Area Network", vol. 42, No. 12, Fire Control & Command Control, (School of Computer and Communication Engineering, Zhengzhou University of Light Industry, Zhengzhou 45002, China), dated Dec. 2017, 6 pages.
Keyur Golani et al., "Fault Tolerant Traffic Engineering in Software-defined WAN", 2018 IEEE Symposium on Computers and Communications (ISCC), 6 pages.
Rohyans, A. et al., "Cloud Scale Architecture," Cisco SD-WAN, Jan. 1, 2019, pp. 1-216.
Patent Cooperation Treaty, International Search Report and Written Opinion, International No. PCT/US2020/034781, dated Jul. 27, 2020, 10 pages.
Citrix Systems, Inc., "NetScaler SD-WAN 9.2," Jun. 14, 2017.
International Preliminary Report on Patentability for International Application No. PCT/US2020/034781, mailed Dec. 16, 2021, 9 Pages.
Office Action for Indian Application No. 202127056888, dated Mar. 8, 2024, 6 Pages.

* cited by examiner

SYSTEMS AND METHODS FOR DISTRIBUTING SD-WAN POLICIES

CROSS-REFERENCE TO RELATED APPLICATIONS

[111] This application is a continuation of U.S. patent application Ser. No. 16/574,963 filed Sep. 18, 2019, by Stefan Olofsson et al., and entitled "SYSTEMS AND METHODS FOR DISTRIBUTING SD-WAN POLICIES," which claims the benefit of U.S. Provisional Patent Application No. 62/858,136 filed Jun. 6, 2019 by Stefan Olofsson et al., and entitled "Segmentation, Policy Dissemination, and Path Selection for Roaming Clients," which are incorporated herein by reference.

TECHNICAL FIELD

This disclosure generally relates to distributing policies, and more specifically to systems and methods for distributing software-defined networking in a wide area network (SD-WAN) policies.

BACKGROUND

Traditional WAN architectures connect users at branch or campus locations to applications hosted on servers in a data center. Typically, dedicated Multiprotocol Label Switching (MPLS) circuits are used for security protection and reliable connectivity. However, businesses are becoming increasingly mobile, and business-critical applications are operating over the Internet across multiple clouds. Traditional WAN architectures are limited in available bandwidth, security, and complexity management, which may hinder a business's productivity.

DESCRIPTION OF EXAMPLE EMBODIMENTS

Overview

Figure 1:
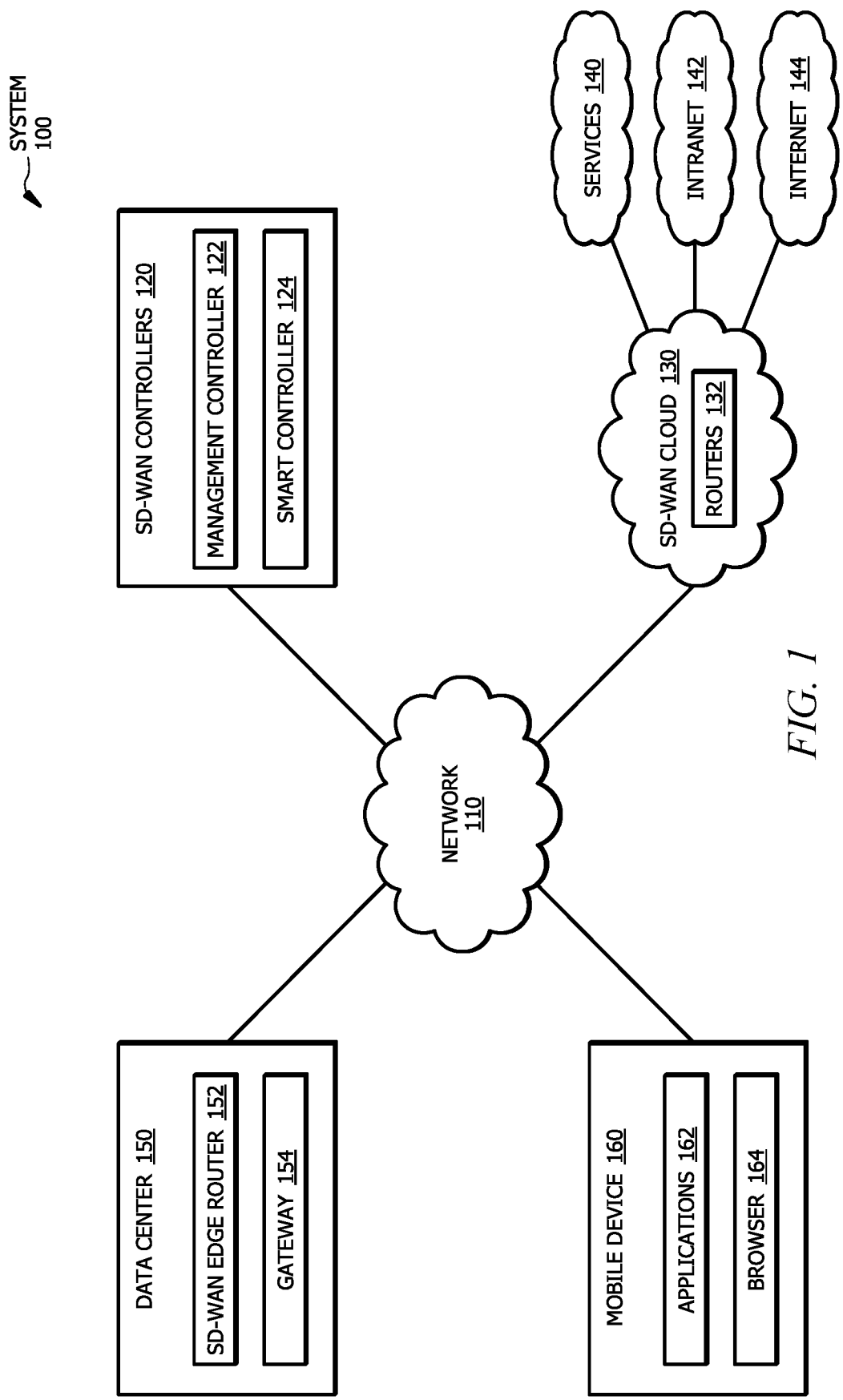
FIG. 1 illustrates a system for distributing SD-WAN policies to a mobile device, in accordance with certain embodiments.

According to an embodiment, a router includes one or more processors and one or more computer-readable non-transitory storage media coupled to the one or more processors. The one or more computer-readable non-transitory storage media include instructions that, when executed by the one or more processors, cause the router to perform operations including receiving SD-WAN policies from a component of an SD-WAN network. The operations also include establishing a session with a mobile device and receiving information associated with the mobile device in response to establishing the session with the mobile device. The operations further include filtering the SD-WAN policies based on the information associated with the mobile device to generate SD-WAN device-specific policies and communicating the SD-WAN device-specific policies to the mobile device.

The operations may include receiving updated SD-WAN policies from the component of the SD-WAN network, filtering the updated SD-WAN policies based on the information associated with the mobile device to generate updated SD-WAN device-specific policies, and communicating the updated SD-WAN device-specific policies to the mobile device. The operations may include receiving updated information associated with the mobile device, filtering the SD-WAN policies based on the updated information associated with the mobile device to generate updated SD-WAN device-specific policies, and communicating the updated SD-WAN device-specific policies to the mobile device. The SD-WAN policies may include at least one of the following types of policies: access policies, segmentation-based policies, flow classification policies, and/or path selection policies. The information associated with the mobile device may include at least one of the following types of information: user profile information, device posture information, security posture information, and/or authentication, authorization, and accounting information. In certain embodiments, the router is a virtual routing and forwarding (VRF) enterprise Internet Protocol Security (IPsec) gateway and the component of the SD-WAN network is a VRF SD-WAN edge router. In some embodiments, the session between the mobile device and the router is a Virtual Private Network (VPN) session and the router is a VRF enterprise Secure Sockets Layer/Transport Layer Security SSL/TLS gateway.

According to another embodiment, a method includes receiving, by a router, SD-WAN policies from a component of an SD-WAN network. The method also includes establishing, by the router, a session with a mobile device and receiving, by the router, information associated with the mobile device in response to establishing the session with the mobile device. The method further includes filtering, by the router, the SD-WAN policies based on the information associated with the mobile device to generate SD-WAN device-specific policies and communicating, by the router, the SD-WAN device-specific policies to the mobile device.

The method may include receiving updated SD-WAN policies from the component of the SD-WAN network, filtering the updated SD-WAN policies based on the information associated with the mobile device to generate updated SD-WAN device-specific policies, and communicating the updated SD-WAN device-specific policies to the mobile device. The method may include receiving updated information associated with the mobile device, filtering the SD-WAN policies based on the updated information associated with the mobile device to generate updated SD-WAN device-specific policies, and communicating the updated SD-WAN device-specific policies to the mobile device. The SD-WAN policies may include at least one of the following types of policies: access policies, segmentation-based policies, flow classification policies, and/or path selection policies. The information associated with the mobile device may include at least one of the following types of information: user profile information, device posture information, security posture information, and/or authentication, authorization, and accounting information. In certain embodiments, the router is a VRF enterprise IPsec gateway and the component of the SD-WAN network is a VRF SD-WAN edge router. In some embodiments, the session between the mobile device and the router is a VPN session and the router is a VRF enterprise Secure Sockets Layer/Transport Layer Security SSL/TLS gateway.

According to another embodiment, one or more computer-readable non-transitory storage media include instructions that, when executed by a processor, cause the processor to perform operations including receiving SD-WAN policies from a component of an SD-WAN network. The operations also include establishing a session with a mobile device and receiving information associated with the mobile device in response to establishing the session with the mobile device. The operations further include filtering the SD-WAN policies based on the information associated with the mobile device to generate SD-WAN device-specific policies and communicating the SD-WAN device-specific policies to the mobile device.

The operations may include receiving updated SD-WAN policies from the component of the SD-WAN network, filtering the updated SD-WAN policies based on the information associated with the mobile device to generate updated SD-WAN device-specific policies, and communicating the updated SD-WAN device-specific policies to the mobile device. The operations may include receiving updated information associated with the mobile device, filtering the SD-WAN policies based on the updated information associated with the mobile device to generate updated SD-WAN device-specific policies, and communicating the updated SD-WAN device-specific policies to the mobile device. The SD-WAN policies may include at least one of the following types of policies: access policies, segmentation-based policies, flow classification policies, and/or path selection policies. The information associated with the mobile device may include at least one of the following types of information: user profile information, device posture information, security posture information, and/or authentication, authorization, and accounting information. In certain embodiments, the router is a VRF enterprise IPsec gateway and the component of the SD-WAN network is a VRF SD-WAN edge router. In some embodiments, the session between the mobile device and the router is a VPN session and the router is a VRF enterprise Secure Sockets Layer/Transport Layer Security SSL/TLS gateway.

According to yet another embodiment, a mobile device includes one or more processors and one or more computer-readable non-transitory storage media coupled to the one or more processors. The one or more computer-readable non-transitory storage media include instructions that, when executed by the one or more processors, cause the mobile device to perform operations including establishing a session with a router of an SD-WAN network. The operations also include communicating information associated with the mobile device to the router of the SD-WAN network in response to establishing the session with the router of the SD-WAN network. The operations further include receiving SD-WAN device-specific policies from the router of the SD-WAN network. The SD-WAN device-specific policies are a subset of SD-WAN policies that have been filtered based on the information associated with the mobile device.

Technical advantages of certain embodiments of this disclosure may include one or more of the following. Core SD-WAN capabilities may be extended to mobile devices through participation in a policy framework with targeted contextual abilities for segmentation, flow classification, and path selection. Policy instruction inclusive of dynamic policy updates may be efficiently distributed to mobile devices. Policy hierarchy involving both authentication, authorization, and accounting (AAA) and the existing SD-WAN policy framework may be supported. Mobile devices may be integrated to SD-WAN without incurring scalability challenges for the SD-WAN control and management infrastructure.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

In certain embodiments of this disclosure, a mobile device is equipped to benefit from core SD-WAN capabilities through participation in a policy framework with targeted contextual abilities for segmentation, flow classification, and path selection. Policy instruction, dynamic policy updates, and policy hierarchy are efficiently distributed to allow for end-device classification.

Figure 2:
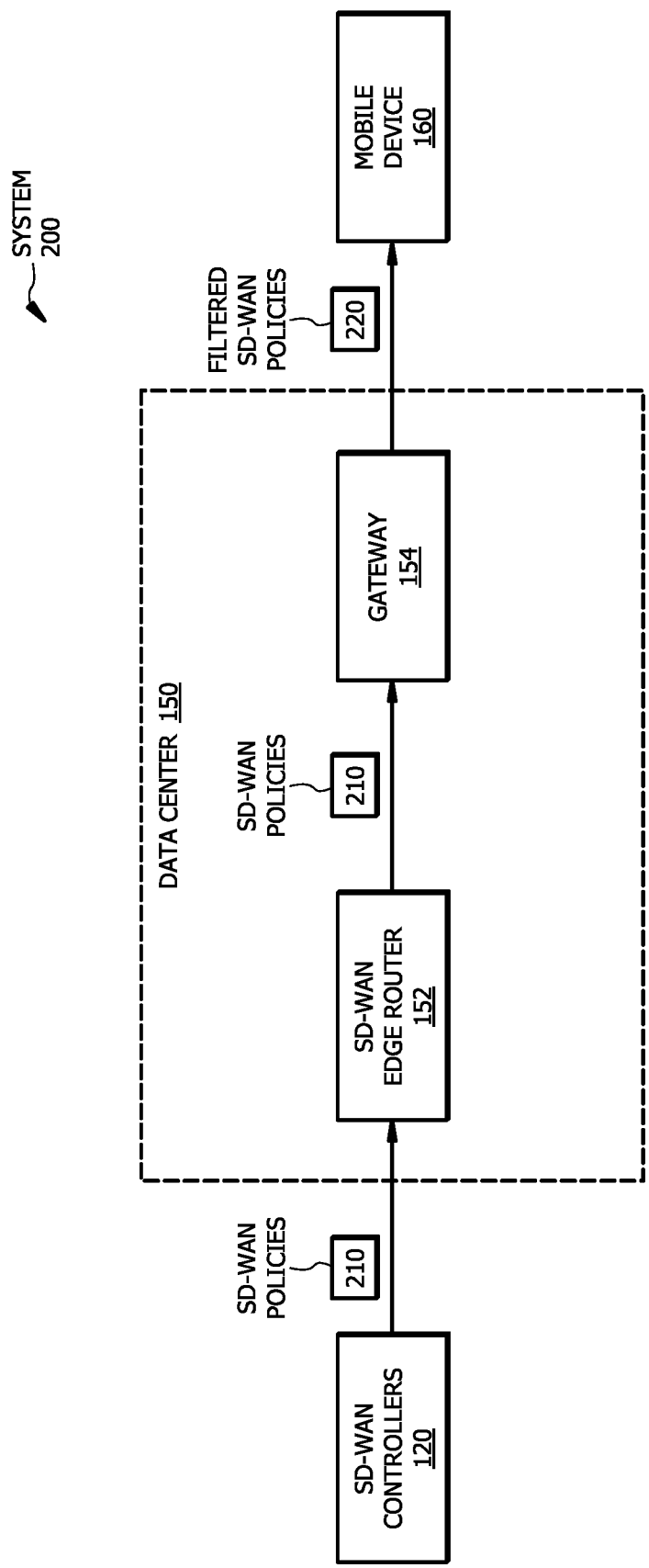
FIG. 2 illustrates another system for distributing SD-WAN policies to a mobile device that may be used by the system of FIG. 1, in accordance with certain embodiments.
Figure 3:
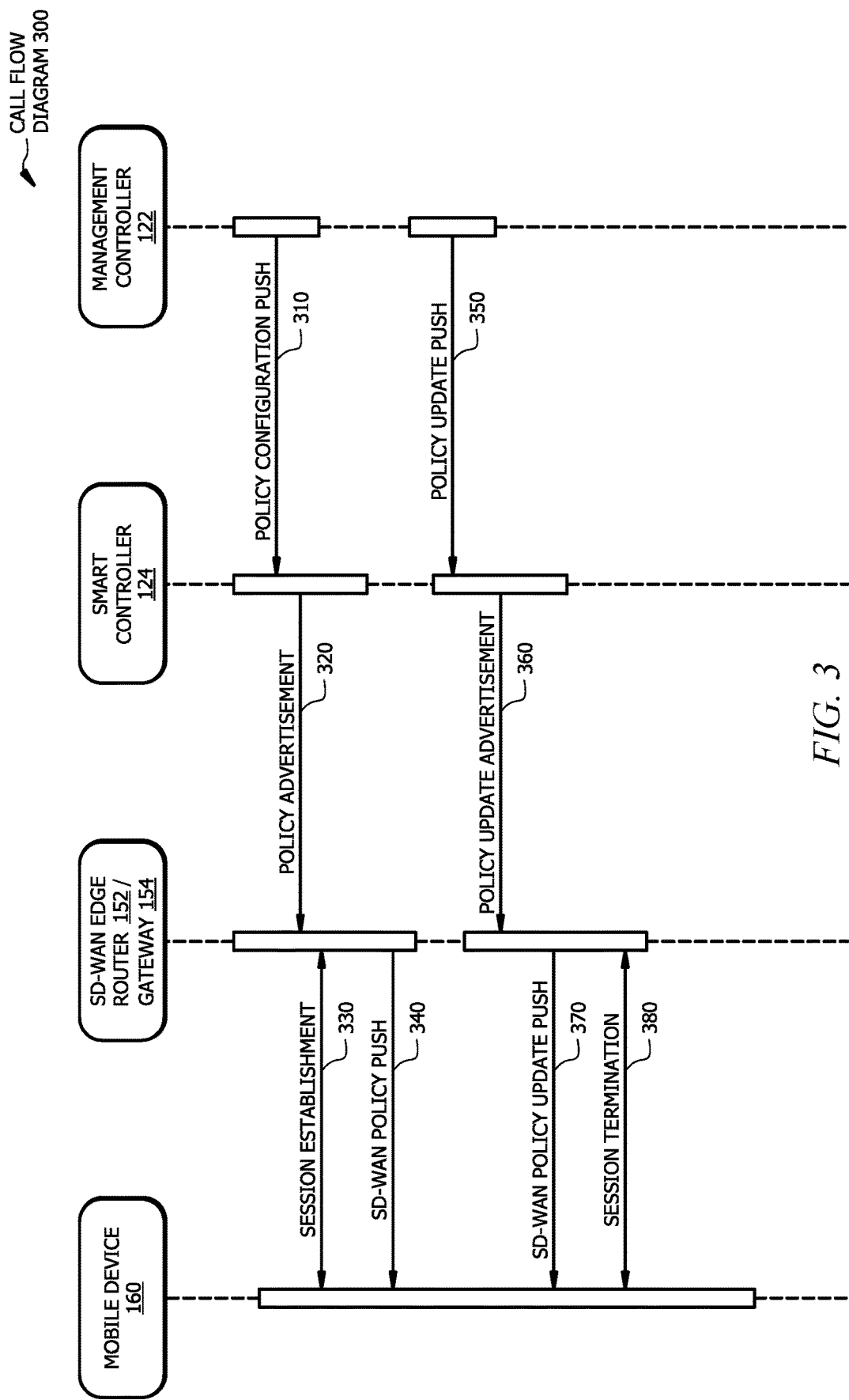
FIG. 3 illustrates a call flow diagram that may be used by the system of FIG. 1, in accordance with certain embodiments.
Figure 4:
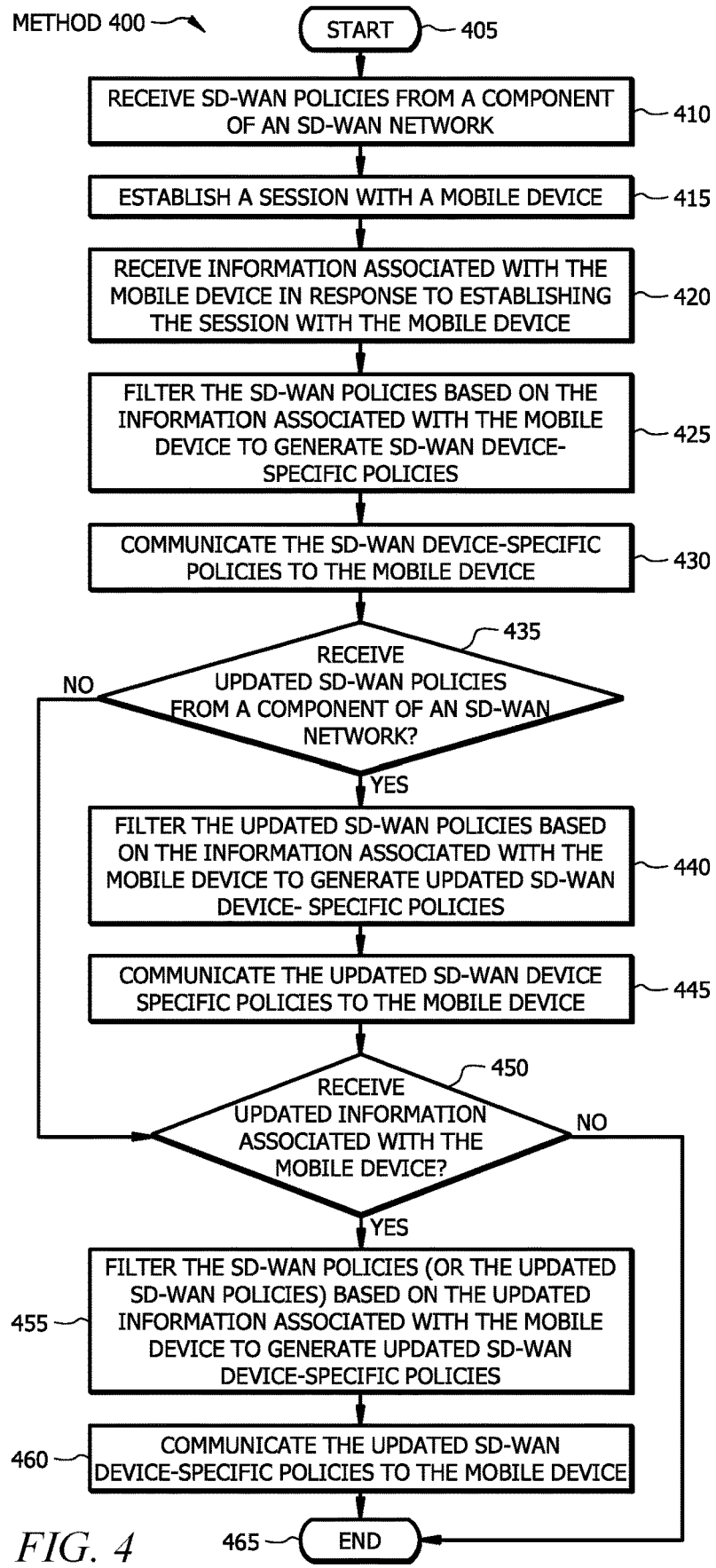
FIG. 4 illustrates a method for distributing SD-WAN policies to a mobile device, in accordance with certain embodiments.
Figure 5:
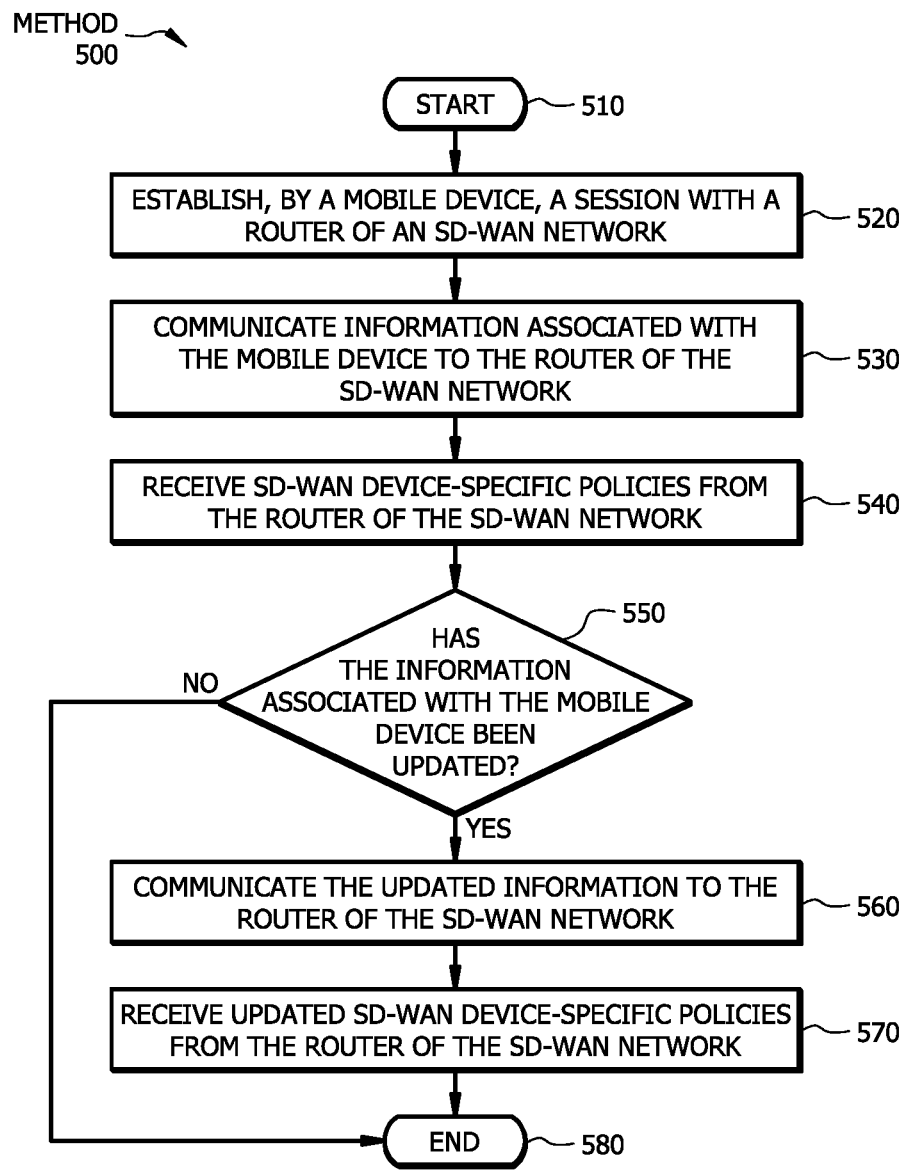
FIG. 5 illustrates a method for receiving SD-WAN policies by a mobile device, in accordance with certain embodiments.
Figure 6:
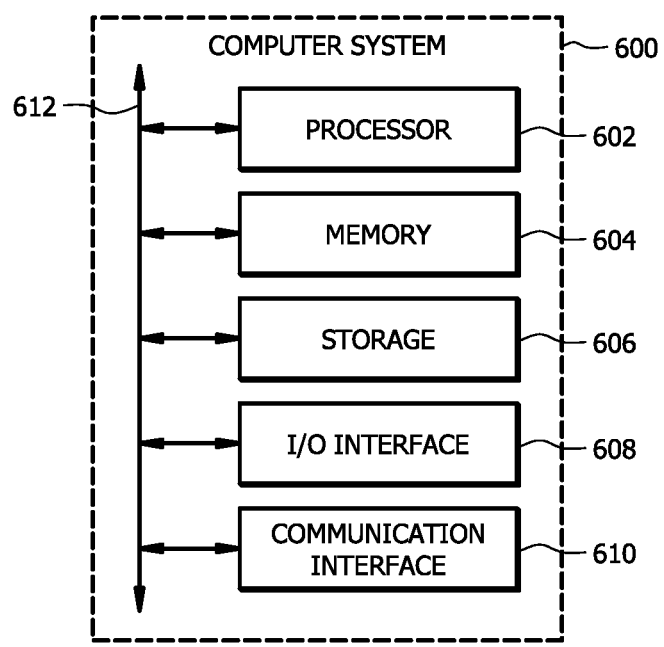
FIG. 6 illustrates a computer system, in accordance with certain embodiments.

FIG. 1 shows an example system for distributing SD-WAN policies to a mobile device, and FIG. 2 shows another example system for distributing SD-WAN policies to a mobile device that may be used by the system of FIG. 1. FIG. 3 shows a call flow diagram that may be used by the system of FIG. 1. FIG. 4 shows a method for distributing SD-WAN policies to a mobile device, and FIG. 5 shows a method for receiving SD-WAN policies by a mobile device. FIG. 6 shows a computer system, in accordance with certain embodiments.

FIG. 1 illustrates an example system 100 for distributing SD-WAN policies to a mobile device in a networking environment. SD-WAN is a specific application of software defined networking (SDN) technology applied to WAN connections (e.g., broadband Internet, 4G, 5G, LTE, MPLS, etc.). SD-WAN connects enterprise networks (e.g., branch offices and data centers) over large geographic distances. SD-WAN policies (e.g., SD-WAN policies 210 of FIG. 2) regulate aspects of control and forwarding within network 110. SD-WAN policies may include access policies, segmentation-based policies, flow classification policies, path selection policies, and the like. SD-WAN policies may include application routing policies for application-aware routing, control policies for routing and control plane information, data policies for data traffic, VPN membership policies for limiting the scope of traffic to specific VPNs, and the like. SD-WAN policies are described in more detail in FIG. 2 below.

System 100 or portions thereof may be associated with an entity, which may include any entity, such as a business or company (e.g., a service provider) that distributes SD-WAN policies. The components of system 100 may include any suitable combination of hardware, firmware, and software. For example, the components of system 100 may use one or more elements of the computer system of FIG. 6.

System 100 includes network 110, SD-WAN controllers 120, SD-WAN cloud 130, data center 150, and mobile device 160. Network 110 of system 100 is any type of network that facilitates communication between components of system 100. Network 110 may connect one or more components of system 100. This disclosure contemplates any suitable network. One or more portions of network 110 may include an ad-hoc network, an intranet, an extranet, a VPN, a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a combination of two or more of these, or other suitable types of networks. Network 110 may include one or more networks. Network 110 may be any communications network, such as a private network, a public network, a connection through Internet, a mobile network, a WI-FI network, etc. One or more components of system 100 may communicate over network 110. Network 110 may include a core network (e.g., the Internet), an access network of a service provider, an Internet service provider (ISP) network, and the like. One or more portions of network 110 may utilize SD-WAN technology.

SD-WAN controllers 120 of system 100 are components that manage and distribute SD-WAN policies within network 110. SD-WAN controllers 120 include a management controller 122 and a smart controller 124. Management controller 122 of network 110 is a network controller that creates and/or maintains SD-WAN policies. Once an SD-WAN policy is committed, management controller 122 pushes the SD-WAN policy to smart controller 124. Management controller 122 may push one or more SD-WAN policies to smart controller 124 using Network Configuration Protocol (NETCONF).

Smart controller 124 is a network controller that anchors the dynamic control plane of the SD-WAN. Every SD-WAN endpoint may be in permanent session with smart controller 124 with an Overlay Management Protocol (OMP) session in place for routing, security, and policy information exchange and distribution. As SD-WAN policies and updated SD-WAN policies are received by smart controller 124 from management controller 122, smart controller 124 may immediately advertise the SD-WAN policies and updated SD-WAN policies as OMP routing updates from smart controller 124 towards all affected SD-WAN endpoints (e.g., SD-WAN edge router 152).

SD-WAN cloud 130 of system 100 provides computer system resources (e.g., data storage and computing power) to multiple users (e.g., gateway 154 and mobile device 160) over the Internet. SD-WAN cloud 130 may be used to separate data and control planes. SD-WAN cloud 130 may include both hardware and software components. For example, SD-WAN cloud 130 may include one or more routers 132 (e.g., cloud routers), applications, servers, and the like. SD-WAN cloud 130 may be managed by a single entity (e.g., a service provider). SD-WAN cloud 130 may provide access to one or more services 140, one or more intranets 142, and/or the Internet 144. For example, router 132 of SD-WAN cloud 130 may be an SD-WAN edge router that provides access to one or more intranets 142 (e.g., enterprise branch or campus intranets). Intranets 142 may host services 140 such as printing services, Information Technology (IT) services, and the like. As another example, router 132 may provide access to Internet 144 through a security gateway. In certain embodiments, SD-WAN cloud 130 may host one or more SD-WAN controllers 120, one or more components of data center 150, and the like.

Data center 150 of system 100 is a network of computing and storage resources that facilitates the distribution of SD-WAN policies within the SD-WAN environment. Data center 150 may be associated with and/or controlled by an entity such as a service provider. Data center 150 may serve as a point of presence (POP) between different components of system 100. Data center 150 includes an SD-WAN edge router 152 and a gateway 154. In some embodiments, SD-WAN edge router 152 and gateway 154 are combined into a single aggregation device. The aggregation device may support its remote access termination capabilities in combination with WAN edge functions for the combined capability of remote mobile client access to an SD-WAN domain.

SD-WAN edge router 152 is a router that is located at the SD-WAN network boundary. SD-WAN edge router 152 may serve as an SD-WAN edge endpoint (e.g., a data plane endpoint.) SD-WAN edge router 152 may route Internet Protocol (IP) packets between networks. SD-WAN edge router 152 may use VRF to allow multiple instances of a routing table to co-exist within the same router at the same time. SD-WAN edge router 152 receives SD-WAN policies from smart controller 124 and forwards the SD-WAN policies to gateway 154.

Gateway 154 is a router that provides access for IP packets into and/or out of a local network. Gateway 154 may use VRF to allow multiple instances of a routing table to co-exist within the same router at the same time. Gateway 154 may use a VPN to communicate information to mobile device 160. The VPN allows gateway 154 to send and receive data to mobile device 160 across a shared or public network as if gateway 154 and mobile device 160 are directly connected to a private network.

In certain embodiments, gateway 154 may be an IPsec gateway 154 that operates in IPsec tunnel mode. In IPsec tunnel mode, an entire IP packet is protected by IPsec. IPsec wraps the IP packet, encrypts the IP packet, and sends the IP packet through the IPsec tunnel. The IPsec tunnel may be used to encrypt traffic between two secure IPsec gateways. For example, the IPsec tunnel may be used to encrypt traffic between two routers connected over the Internet via IPsec VPN.

In certain embodiments, gateway 154 may be a Secure Socket Layer (SSL)-enabled VPN gateway. SSL VPN gateway 154 allows remote users to establish a secure VPN tunnel using a web browser (e.g., browser 164 of mobile device 160 of FIG. 1.) SSL VPN technology uses SSL protocol and Transport Layer Security (TLS) (or Datagram TLS (DTLS)) to provide a secure connection between gateway 154 and mobile device 160.

Gateway 154 of data center 150 may use IPsec and/or SSL for user authentication. For example, gateway 154 may leverage existing group definitions for IPsec and SSL terminations such that SD-WAN policies are assigned to the group instances defined on gateway 154. Gateway 154 may implement IPsec Remote Access and SSL VPN termination capabilities while also operating as an SD-WAN edge device. This SD-WAN capability allows for the reception of SD-WAN policies distributed from the existing policy distribution provided within the SD-WAN infrastructure. In certain embodiments, gateway 154 may communicate with an identity services engine to receive SD-WAN policies. The identity services engine may be a server based product (e.g., an appliance or a virtual machine) that enables the creation and/or enforcement of access polices for endpoint devices (e.g., mobile device 160) connected to network 110.

Gateway 154 may filter SD-WAN policies based on information associated with mobile device 160 (e.g., user profile information, device posture information, security posture information, information received from an AAA server, etc.) and push the filtered SD-WAN policies (e.g., filtered SD-WAN policies 220 of FIG. 2) to mobile device 160. In certain embodiments, gateway 154 may receive updated SD-WAN policies and filter the updated SD-WAN policies based on information associated with mobile device 160. In some embodiments, gateway 154 may receive updated information (e.g., updated user profile information, updated device posture information, etc.) from mobile device 160 and filter the SD-WAN policies based on the updated information from mobile device 160. Gateway 154 may receive updated SD-WAN policies and/or updated information associated with mobile device 160 periodically and/or in response to one or more events (e.g., a change in user profile information, a change in device posture information, etc.)

In certain embodiments, gateway 154 may receive information from one or more services and update the SD-WAN policies based on the received information. For example, gateway 154 may receive security posture information from a network visibility service. As another example, gateway 154 may receive device posture information from a cloud-based authentication service. In some embodiments, gateway 154 may update the SD-WAN policies based on the information received from multiple sources (e.g., mobile device 160, an AAA server, a network visibility service, etc.) In certain embodiments, the information used to update the SD-WAN policies is received by gateway 154 from a source outside the SD-WAN network.

Mobile device 160 of system 100 is any end device that receives information (e.g., filtered SD-WAN policies) from one or more components of system 100. In certain embodiments, mobile device 160 is a handheld computer. Mobile device 160 may be a mobile phone (e.g., a smart phone), a laptop computer, a tablet, a personal digital assistant, and the like. Mobile device 160 may include a liquid crystal display (LCD), an organic light-emitting diode (OLED) flat screen interface, digital buttons, a digital keyboard, physical buttons, a physical keyboard, one or more touch screen components, and the like. Mobile device 160 may be associated with an entity such as a service provider. Mobile device 160 may include a graphical user interface (GUI). Mobile device may include one or more components of the computer system of FIG. 6.

Mobile device 160 includes one or more applications 162 and one or more browsers 164. Applications 162 may include native applications that are built for a specific operating system, mobile web applications that render and/or deliver pages on browsers running in mobile device 160, hybrid applications that are a mixture of native applications and mobile web applications, and the like. Browser 164 is a software application for accessing information on the World Wide Web. Browser 164 may be optimized to display Web content effectively for small screens. In certain embodiments, an SD-WAN agent may be deployed on mobile device 160 to access the SD-WAN network.

Mobile device 160 may establish a connection with gateway 154 of data center 150. In response to establishing the session with gateway 154 of data center 150, mobile device 160 may communicate information associated with mobile device 160 to gateway 154. The information may include user profile information (e.g., username, password, etc.), device posture information (e.g., operating system, antivirus, antispyware, firewall software, hostname, IP address, MAC address, port numbers, serial numbers, registry entries, local certificates, filenames, etc.), security posture information, and the like. Mobile device 160 may communicate updated information (e.g., updated user profile information, updated device posture information, etc.) to gateway 154 on a periodic basis and/or in response to one or more events (e.g., a change in user profile information.) Mobile device 160 may use IPsec and/or SSL to exchange information with gateway 154 of data center 150.

In operation, management controller 122 of system 100 creates and/or maintains SD-WAN policies. Once an SD-WAN policy is committed, management controller 122 pushes the SD-WAN policy to smart controller 124 using NETCONF. As SD-WAN policies are received from management controller 122, smart controller 124 immediately advertises the SD-WAN policies as OMP routing tables to affected SD-WAN edge router 152 of data center 150. SD-WAN edge router 152 forwards the SD-WAN policies to gateway 154 of data center 150. Gateway 154 establishes a session with mobile device 160 and, in response to establishing the session with mobile device 160, receives information associated with mobile device 160. Gateway 154 filters the SD-WAN policies based on the information associated with the mobile device to generate SD-WAN device-specific policies. Gateway 154 communicates the SD-WAN device-specific policies to mobile device 160. As such, system 100 extends SD-WAN capabilities to mobile devices 160, which allows a user of mobile device 160 as well as the enterprises associated with data center 150 to benefit from the SD-WAN infrastructure.

Although FIG. 1 illustrates a particular arrangement of network 110, SD-WAN controllers 120, management controller 122, smart controller 124, SD-WAN cloud 130, routers 132, services 140, intranet 142, Internet 144, data center 150, SD-WAN edge router 152, gateway 154, mobile device 160, applications 162, and browser 164, this disclosure contemplates any suitable arrangement of network 110, SD-WAN controllers 120, management controller 122, smart controller 124, SD-WAN cloud 130, routers 132, services 140, intranet 142, Internet 144, data center 150, SD-WAN edge router 152, gateway 154, mobile device 160, applications 162, and browser 164. For example, one or more SD-WAN controllers 120 may be located in SD-WAN cloud 130. As another example, SD-WAN edge router 152 and gateway 154 may be physically or logically co-located with each other in whole or in part.

Although FIG. 1 illustrates a particular number of networks 110, SD-WAN controllers 120, management controllers 122, smart controllers 124, SD-WAN clouds 130, routers 132, services 140, intranets 142, data centers 150, SD-WAN edge routers 152, gateways 154, mobile devices 160, applications 162, and browsers 164, this disclosure contemplates any suitable number of networks 110, SD-WAN controllers 120, management controllers 122, smart controllers 124, SD-WAN clouds 130, routers 132, services 140, intranets 142, data centers 150, SD-WAN edge routers 152, gateways 154, mobile devices 160, applications 162, and browsers 164. For example, network 110 may include multiple SD-WAN edge routers 152 and multiple mobile devices 160.

FIG. 2 illustrates an example system 200 for distributing SD-WAN policies (e.g., SD-WAN policies 210 and filtered SD-WAN policies 220) that may be used by system 100 of FIG. 1. SD-WAN policies 210 may include access policies, segmentation-based policies, flow classification policies, path selection policies, and the like. SD-WAN policies 210 may be data policies that affect the data traffic flow throughout VPN segments in the network (e.g., network 110 of FIG. 1.) SD-WAN policies 210 may permit and/or restrict access to certain components of the network (e.g., an SD-WAN network) based one or more conditions (e.g., VPN membership, a 6-tuple match, etc.). SD-WAN policies 210 may define which endpoints receive an update. Different SD-WAN policies 210 are defined for different target devices in the network, which may optimize policy distribution within the network (e.g., within an SD-WAN network supporting mobile devices 160.) Filtered SD-WAN policies 220 are SD-WAN policies 210 that are filtered by gateway 154 based on information associated with mobile device 160.

System 200 includes SD-WAN controllers 120, data center 150, SD-WAN edge router 152, gateway 154, and mobile device 160. The components of system 200 are described above in FIG. 1. SD-WAN controllers 120 may create, maintain, push, and advertise SD-WAN policies 210. For example, a management controller (e.g., management controller 122 of FIG. 1) may create and/or maintain SD-WAN policies and push the SD-WAN policies to a smart controller (e.g., smart controller 124 of FIG. 1).

In the illustrated embodiment of FIG. 2, one or more SD-WAN controllers 120 (e.g., smart controller 124 of FIG. 1) advertises SD-WAN policies 210 to SD-WAN edge router 152. SD-WAN edge router 152 forwards SD-WAN policies 210 to gateway 154. Gateway 154 filters SD-WAN policies 210 based on information associated with mobile device 160 to generate filtered SD-WAN policies 220. The information associated with mobile device 160 may include user profile information, device posture information, security posture information, information received from an AAA server (e.g., authentication, authorization, and/or accounting information), and the like. Gateway 154 communicates filtered SD-WAN policies 220 to mobile device 160.

Gateway 154 of data center 150 may define a group identity as part of a defined SD-WAN policy 210 such that the group identity serves both as a policy attachment point and also a data plane identification mechanism, which efficiently enables macro- and micro-segmentation. For example, the use of a Secure Group Tag (SGT) in the data plane may allow for mobile device 160 and gateway 154 of data center 150 to associate traffic with pre-defined segments and/or to enforce micro-segmentation policies applied locally on mobile device 160 and gateway 154. This classification allows segmentation, path selection, traffic management policies, and service invocation for which identification is retained for all required legs of the end-to-end path between mobile device 160 and the ultimately targeted service. Pre-defined policy directives and/or segmentation enforcements may be retained across the extension to mobile device 160. In certain embodiments, changes to the pre-defined policy directives and/or segmentation enforcements are communicated to mobile device 160 dynamically.

The SD-WAN infrastructure provides an existing policy distribution vehicle where centrally defined SD-WAN policies 210 may be efficiently distributed towards target endpoints. The existing vehicle may distribute SD-WAN policies 210 towards explicitly defined targets that are native members of the SD-WAN infrastructure. SD-WAN edge router 152 may receive SD-WAN policies 210 from one or more components of the SD-WAN infrastructure and forward SD-WAN policies 210 to gateway 154. Gateway 154 of data center 150 may link specific elements of distributed SD-WAN policies 210 towards defined groups, which may assist in granularly applying and distributing filtered SD-WAN policies 220 towards the ultimate policy targets. Existing AAA policies may also be enforced that are applied towards individual users of mobile devices 160, which may affect certain aspects of a session such as VRF membership and other session specific parameters. The VRF membership aspect may be impacted by the macro/micro-segmentation capabilities along with other aspects related to path selection, service level agreement (SLA) information, and application specific traffic treatment. In certain embodiments, leveraging AAA and/or SD-WAN policies 210 using policy hierarchy provides an intelligent interaction between policies originating from different sources and may extend the overall policy framework to include device specific directives in a scalable and granular fashion.

Gateway 154 of data center 150 may include a policy management agent that processes and/or distributes filtered SD-WAN policies 220 from data center 150 to mobile device 160. A User Datagram Protocol (UDP)-based transport protocol may be used to minimize overhead while providing a scalable and trustworthy vehicle for policy distribution across this specific leg of the network. An existing and secure path between gateway 154 of data center 150 and mobile device 160 may be assumed such that security (e.g., IPsec and/or SSL security) is less of a concern than providing a simple and scalable capability.

In certain embodiments, gateway 154 may receive updated SD-WAN policies 210 from SD-WAN edge router 152 of data center 150. Gateway 154 may filter the updated SD-WAN policies to generate updated, filtered SD-WAN policies 220, which may be dynamically distributed to mobile device 160. Gateway 154 may receive an updated SD-WAN policy 210 from the SD-WAN control plane at any time, which may cause the policy management agent of gateway 154 to filter updated SD-WAN policy 210 and communicate updated, filtered SD-WAN policy 220 to mobile device 160. Updated SD-WAN policy 210 may be generically targeted or more granularly based on group target definitions contained within updated SD-WAN policy 210. As such, the use of a policy management agent at gateway 154 provides the ability to dynamically update filtered SD-WAN policies 220 toward mobile devices 160, where the dynamic may be extended toward both SD-WAN and AAA derived policies ultimately guided by SD-WAN sourced policies 210.

Gateway 154 of data center 150 may define one or more functional groups (e.g., Group A and Group B) such that each functional group requires different levels of segmentation, policy instruction, and/or imposed behavior according to its defined service subscription in the SD-WAN infrastructure. For example, Group A may include a set of enterprise power users that requires access to a suite of enterprise-grade productivity applications that are hosted by the provider, private applications that are hosted by the provider, and Internet access for other applications. For security reasons, the Internet access may be provided via regional breakout points. In one or more components of data center 150, Group A may be been given a first dedicated VRF within the provider network corresponding to its access needs. One or more filtered SD-WAN policies 220 designed to be pushed to mobile device 160 may define how different applications are to be accessed. Filtered SD-WAN policies 220 for Group A may define the following: VPN Membership—Group A; access to a suite of enterprise-grade productivity applications—Segment 1; access to private applications-Segment 2; and Internet access for other applications—Segment 3.

As another example, Group B may be a set of employees that require access to a different set of private applications hosted within the provider infrastructure and Internet access for other applications. The Internet access may be provided via local breakout directly from mobile device 160. Group B may be given a second dedicated VRF within the provider network with a dedicated policy pushed down to mobile device 160. Filtered SD-WAN policies 220 for Group B may define the following: VPN Membership—Group B; access to private applications—Segment 4; and Internet access for other applications—local breakout.

SD-WAN policies 210 may be maintained on an SD-WAN controller 120 (e.g., management controller 120 of FIG. 1) and pushed down to every aggregation device (e.g., gateway 154) defined in the SD-WAN infrastructure by an existing attribute. As such, SD-WAN policies 210 may be present in the policy management agent running in gateway 154 after SD-WAN policies 210 are created and pushed from management controller 122. The policy management agent of gateway 154 may manage the interaction between the OMP process receiving SD-WAN policies 210 and the subsequent push of filtered SD-WAN policies 220, which may result from mobile device 160 establishing a session and authenticating into a certain group identity. The association between mobile device 160 and the group identity may be managed within the realm of AAA authentication.

Filtered SD-WAN policies 220 are used to assign and/or relay segment identities and assign the associated SGTs used across the last mile link for linkage between an application flow and a pre-defined segment. Segments may represent VRFs or micro-segments. For example, the SGT may represent micro-segments in a single VRF. Once mobile device 160 is connected, authenticated, and has received and applied filtered SD-WAN policy 220, mobile device 160 may begin the process of establishing application flows. These flows may be characterized by L3/L4 information, fully qualified domain names (FQDNs), or other attributes distributed by one or more filtered SD-WAN policies 220. These characterizations allow mobile device 160 to ensure that application flows are associated with the appropriate segment.

In case of any changes (e.g., a new segment added for access by group A), an updated SD-WAN policy 210 may be received by one or more SD-WAN controllers 120 and advertised to SD-WAN edge router 152. SD-WAN edge router 152 may forward updated SD-WAN policy 210 to gateway 154 (e.g., the policy management agent). Gateway 154 may push updated, filtered SD-WAN policy 220 toward all mobile devices 160 that have been authenticated to belong to Group A on gateway 154. Filtered SD-WAN polices 220 may include periodic AAA re-authentication and/or re-authorization, mobile device messaging, mobile device and/or segment isolation, and the like to allow a fully dynamic mobile device/session management operational environment.

Pull and push methods for policy relay towards an agent of mobile device 160 may be utilized. For example, the agent of mobile device 160 may pull the latest filtered SD-WAN policies 220 when the agent connects to gateway 154 (e.g., the IPsec and/or SSL/TLS gateway.) The pull method may use HyperText Transfer Protocol/Representational State Transfer (HTTP/REST) to pull information from gateway 154. To verify that mobile device 160 operates on the latest information, the pull method may use long polling and continuously read updates. This pull method may be used by agents running on mobile device 160 for security posture and other higher level functions rather than network connectivity. In the push method, the policy management agent of gateway 154 exclusively uses a push vehicle to distribute filtered SD-WAN policies 220 to the agent of mobile device 160.

Although FIG. 2 illustrates a particular arrangement of SD-WAN controllers 120, data center 150, SD-WAN edge router 152, gateway 154, and mobile device 160, this disclosure contemplates any suitable arrangement of SD-WAN controllers 120, data center 150, SD-WAN edge router 152, gateway 154, and mobile device 160. For example, mobile device 160 may communicate information (e.g., user profile information) to gateway 154. As another example, system 100 may include an AAA server that communicates information to gateway 154 of data center 150. Although FIG. 2 illustrates a particular number of SD-WAN controllers 120, data centers 150, SD-WAN edge routers 152, gateways 154, and mobile devices 160, this disclosure contemplates any suitable number of SD-WAN controllers 120, data centers 150, SD-WAN edge routers 152, gateways 154, and mobile devices 160. For example, system 200 may include multiple SD-WAN edge routers 152 and multiple mobile devices 160.

Although system 200 of FIG. 2 describes SD-WAN policies 210 and filtered SD-WAN policies 220 as being associated with SD-WAN, this disclosure contemplates SD-WAN policies 210 and filtered SD-WAN policies 220 associated with any suitable technology platform. For example, SD-WAN policies 210 and filtered SD-WAN policies 220 may be associated with virtual WAN, hybrid WAN, artificial intelligence (e.g., machine learning) platforms, and the like.

FIG. 3 illustrates an example call flow diagram 300 that may be used by system 100 of FIG. 1. Call flow diagram 300 includes management controller 122, smart controller 124, SD-WAN edge router 152, gateway 154, and mobile device 160. The components of call flow diagram 300 are described in more detail in FIG. 1 above.

At step 310 of call flow diagram 300, management controller 122 pushes one or more policy configurations to smart controller 124. The policy configurations include SD-WAN policies (e.g., SD-WAN policies 210 of FIG. 2.) The policy configurations may include control policies, which affect the overlay network-wide routing of traffic, and data policies, which affect the data traffic flow throughout VPN segments in the network. Control policies apply to the network-wide routing of traffic by affecting the information that is stored in the route table of smart controller 124 and that is advertised to the one or more SD-WAN routers 152. Control policy configurations remain within smart controller 124. Control polies are not pushed to SD-WAN edge router 152. Data policies apply to the flow of data traffic throughout the VPNs in the overlay network. Data policies may permit and/or restrict access. Certain SD-WAN policies, such as access policies, segmentation-based policies, flow classification policies, and/or path selection policies are pushed to SD-WAN edge router 152.

At step 320 of call flow diagram 300, smart controller 124 advertises the SD-WAN policies. For example, smart controller 124 may advertise one or more SD-WAN policies as an OMP routing update to SD-WAN edge router 152. SD-WAN edge router 152 forwards the SD-WAN policies to gateway 154 (e.g., an IPsec gateway or an SSL gateway). At step 330 of call flow diagram 300, gateway 154 establishes a session with mobile device 160. The session is a temporary and interactive information interchange between mobile device 160 and gateway 154. The session is established at a certain point in time and is terminated at a certain point of time. After the session between gateway 154 and mobile device 160 is established, gateway 154 filters the SD-WAN policies based on information associated with mobile device 160 (e.g., username, profile, authentication, authorization, and/or accounting information associated with mobile device 160) to generate filtered SD-WAN policies (e.g., filtered SD-WAN policies 220 of FIG. 2.)

At step 340 of call flow diagram 300, gateway 154 pushes the one or more filtered SD-WAN policies to mobile device 160. Gateway 154 may push the one or more filtered SD-WAN policies to mobile device 160 in response to mobile device 160 establishing the session and authenticating into a group identification. Mobile device 160 may then use the filtered SD-WAN policies to benefit from SD-WAN capabilities within the network.

In certain embodiments, management controller 122 updates and/or receives one or more updated SD-WAN policies. At step 350 of call flow diagram 300, management controller 122 may push the updated SD-WAN policies to smart controller 124. At step 360 of call flow diagram 300, smart controller 124 advertises the updated SD-WAN policies to SD-WAN edge router 152. For example, smart controller 124 may advertise the updated SD-WAN policies as an OMP routing update to SD-WAN edge router 152. SD-WAN edge router 152 forwards the SD-WAN policies to gateway 154 (e.g., an IPsec gateway or an SSL gateway). At step 370 of call flow diagram 300, gateway 154 pushes the updated SD-WAN policies to mobile device 160. The session between mobile device 160 and gateway 154 of call flow diagram 300 terminates at step 380.

Although this disclosure describes and illustrates particular steps of the call flow diagram 300 of FIG. 3 as occurring in a particular order, this disclosure contemplates any suitable steps of the call flow diagram 300 of FIG. 3 occurring in any suitable order. Moreover, although this disclosure describes and illustrates an example call flow diagram 300 of an SD-WAN infrastructure supporting mobile devices including the particular steps of the method of FIG. 3, this disclosure contemplates any suitable call flow diagram 300 of an infrastructure supporting mobile devices including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

FIG. 4 illustrates an example method 400 for distributing SD-WAN policies (e.g., SD-WAN polices 210 of FIG. 2) within a network (e.g., network 110 of FIG. 1.) Method 400 of FIG. 4 begins at step 405. At step 410, a router (e.g., gateway 154 of FIG. 1) receives one or more SD-WAN policies from a component (e.g., SD-WAN edge router 152 of FIG. 1) of an SD-WAN network. The SD-WAN policies may be data polices that are created, maintained, and/or pushed to the component by one or more SD-WAN controllers (e.g., SD-WAN controllers 120 of FIG. 1.) Method 400 then moves from step 410 to step 415.

At step 415, the router establishes a session with a mobile device (e.g., mobile device 160 of FIG. 1.) Method 400 then moves from step 415 to step 420, where the router receives information associated with the mobile device in response to establishing the session with mobile device 160. For example, the router may receive user profile information from mobile device 160, device posture information from mobile device 160, authentication, authorization, and/or accounting information associated with mobile device 160 from an AAA server, and the like. Method 400 then moves from step 420 to step 425. At step 425, the router filters the SD-WAN policies based on the information associated with the mobile device to generate SD-WAN device-specific policies (e.g., filtered SD-WAN policies 220 of FIG. 2.) Method 400 then moves from step 425 to step 430, where the router communicates the SD-WAN device-specific policies to the mobile device.

At step 435, method 400 determines whether the router received updated SD-WAN policies from a component of the SD-WAN network. For example, an SD-WAN controller may update one or more SD-WAN policies and push the updated SD-WAN policies to an SD-WAN edge router. The SD-WAN edge router may forward the updated SD-WAN policies to the router. If method 400 determines that the router has not received updated SD-WAN policies, method 400 advances from step 435 to step 445. If method 400 determines that the router has received updated SD-WAN policies, method 400 moves from step 435 to step 440, where the router filters the updated SD-WAN policies based on the information associated with the mobile device to generate updated SD-WAN device-specific policies. Method 400 then moves from step 440 to step 445, where the router communicates the updated SD-WAN device-specific policies to the mobile device. Method 400 then moves from step 445 to step 450.

At step 450, method 400 determines whether the router received updated information associated with the mobile device. For example, the router may receive updated user profile information from mobile device 160, updated authentication, authorization, and/or accounting information from the AAA server, and the like. If the router does not receive updated information associated with the mobile device, method 400 moves from step 450 to step 465, where method 400 ends. If the router receives updated information associated with the mobile device, method 400 moves from step 445 to step 455, where the router filters the SD-WAN policies (or the updated SD-WAN device-specific policies from step 440) to generate updated SD-WAN device-specific policies. Method 400 then moves from step 455 to step 460, where the router communicates the updated SD-WAN device-specific policies to the mobile device. Method 400 ends at step 465.

Although this disclosure describes and illustrates particular steps of method 400 of FIG. 4 as occurring in a particular order, this disclosure contemplates any suitable steps of method 400 of FIG. 4 occurring in any suitable order. Moreover, although this disclosure describes and illustrates an example method 400 for distributing SD-WAN policies within a network including the particular steps of the method of FIG. 4, this disclosure contemplates any suitable method 400 for distributing SD-WAN policies within a network, including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

FIG. 5 illustrates an example method 500 for receiving SD-WAN device-specific policies (e.g., SD-WAN policies 220 of FIG. 2) by a mobile device (e.g., mobile device 160 of FIG. 2.) Method 500 begins at step 510. At step 520, the mobile device establishes a session with a router (e.g., gateway 154 of FIG. 1) of an SD-WAN network (e.g., network 110 of FIG. 1.) Method 500 then moves from step 520 to step 530, where the mobile device communicates information associated with the mobile device to the router of the SD-WAN network. For example, the mobile device may communicate user profile information, such as a username and a password, to the router. Method 500 them moves from step 530 to step 540. At step 540, the mobile device receives SD-WAN device specific policies (e.g., filtered SD-WAN policies 220 of FIG. 2) from the router of the SD-WAN network. The router may generate the SD-WAN device specific policies using the information communicated by the mobile device in step 530. Method 500 then moves from step 540 to step 550.

At step 550, the mobile device determines if the information communicated to the router in step 530 has been updated. For example, user profile information or device posture information associated with the mobile device may be updated. If the mobile device determines that the information communicated to the router in step 530 has not been updated, method 500 advances from step 550 to step 580, where method 500 ends. If the mobile device determines that the information communicated to the router in step 530 has been updated, method 500 moves from step 550 to step 560, where the mobile device communicates the updated information to the router of the SD-WAN network. Method 500 then moves from step 560 to step 570, where the mobile device receives updated SD-WAN device-specific policies from the router of the SD-WAN network. The router may generate the updated SD-WAN device-specific policies based on the updated information received by the mobile device in step 560. Method 500 then moves from step 570 to step 580, where method 500 ends.

Although this disclosure describes and illustrates particular steps of method 500 of FIG. 5 as occurring in a particular order, this disclosure contemplates any suitable steps of method 500 of FIG. 5 occurring in any suitable order. Moreover, although this disclosure describes and illustrates an example method 500 for receiving SD-WAN device specific policies by a mobile device including the particular steps of the method of FIG. 5, this disclosure contemplates any suitable method 500 for receiving SD-WAN device specific policies by a mobile device, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a LAN, WAN, MAN, or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein. Embodiments according to the present embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. An apparatus, comprising:
one or more processors; and
one or more computer-readable non-transitory storage media coupled to the one or more processors and comprising instructions that, when executed by the one or more processors, cause the apparatus to perform operations comprising:
receiving software-defined networking in a wide area network (SD-WAN) policies from a component of an SD-WAN network;
establishing a session with a mobile device;
receiving information associated with the mobile device in response to establishing the session with the mobile device, wherein the information associated with the mobile device comprises:
user profile information comprising a username and a password; and
device posture information comprising a hostname and an identification of an operating system;
filtering the SD-WAN policies based on the information associated with the mobile device to generate SD-WAN device-specific policies; and
communicating the SD-WAN device-specific policies to the mobile device.

2. The apparatus of claim 1, the operations further comprising:
receiving updated SD-WAN policies from the component of the SD-WAN network;
filtering the updated SD-WAN policies based on the information associated with the mobile device to generate updated SD-WAN device-specific policies; and
communicating the updated SD-WAN device-specific policies to the mobile device.

3. The apparatus of claim 1, the operations further comprising:
receiving updated information associated with the mobile device;
filtering the SD-WAN policies based on the updated information associated with the mobile device to generate updated SD-WAN device-specific policies; and
communicating the updated SD-WAN device-specific policies to the mobile device.

4. The apparatus of claim 1, wherein the SD-WAN policies comprise at least one of the following types of policies:
access policies;
segmentation-based policies;
flow classification policies; or
path selection policies.

5. The apparatus of claim 1, wherein the information associated with the mobile device further comprises security posture information.

6. The apparatus of claim 1, wherein:
the apparatus is a virtual routing and forwarding (VRF) enterprise Internet Protocol Security (IPsec) gateway; and
the component of the SD-WAN network is a VRF SD-WAN edge router.

7. The apparatus of claim 1, wherein:
the session between the mobile device and the apparatus is a Virtual Private Network (VPN) session; and
the apparatus is a VRF enterprise Secure Sockets Layer/Transport Layer Security SSL/DTLS gateway.

8. A method, comprising:
receiving software-defined networking in a wide area network (SD-WAN) policies from a component of an SD-WAN network;
establishing a session with a mobile device;
receiving information associated with the mobile device in response to establishing the session with the mobile device, wherein the information associated with the mobile device comprises:
  user profile information comprising a username and a password; and
  device posture information comprising a hostname and an identification of an operating system;
filtering the SD-WAN policies based on the information associated with the mobile device to generate SD-WAN device-specific policies; and
communicating the SD-WAN device-specific policies to the mobile device.

9. The method of claim 8, further comprising:
receiving updated SD-WAN policies from the component of the SD-WAN network;
filtering the updated SD-WAN policies based on the information associated with the mobile device to generate updated SD-WAN device-specific policies; and
communicating the updated SD-WAN device-specific policies to the mobile device.

10. The method of claim 8, further comprising:
receiving updated information associated with the mobile device;
filtering the SD-WAN policies based on the updated information associated with the mobile device to generate updated SD-WAN device-specific policies; and
communicating the updated SD-WAN device-specific policies to the mobile device.

11. The method of claim 8, wherein the SD-WAN policies comprise at least one of the following types of policies:
access policies;
segmentation-based policies;
flow classification policies; or
path selection policies.

12. The method of claim 8, wherein the information associated with the mobile device further comprises security posture information.

13. The method of claim 8, wherein:
the SD-WAN policies are received by a virtual routing and forwarding (VRF) enterprise Internet Protocol Security (IPsec) gateway; and
the component of the SD-WAN network is a VRF SD-WAN edge router.

14. The method of claim 8, wherein:
the session is a Virtual Private Network (VPN) session; and
the SD-WAN policies are received by a VRF enterprise Secure Sockets Layer/Transport Layer Security SSL/DTLS gateway.

15. One or more computer-readable non-transitory storage media embodying instructions that, when executed by a processor, cause the processor to perform operations comprising:
receiving software-defined networking in a wide area network (SD-WAN) policies from a component of an SD-WAN network;
establishing a session with a mobile device;
receiving information associated with the mobile device in response to establishing the session with the mobile device, wherein the information associated with the mobile device comprises:
  user profile information comprising a username and a password; and
  device posture information comprising a hostname and an identification of an operating system;
filtering the SD-WAN policies based on the information associated with the mobile device to generate SD-WAN device-specific policies; and
communicating the SD-WAN device-specific policies to the mobile device.

16. The one or more computer-readable storage media of claim 15, the operations further comprising:
receiving updated SD-WAN policies from the component of the SD-WAN network;
filtering the updated SD-WAN policies based on the information associated with the mobile device to generate updated SD-WAN device-specific policies; and
communicating the updated SD-WAN device-specific policies to the mobile device.

17. The one or more computer-readable storage media of claim 15, the operations further comprising:
receiving updated information associated with the mobile device;
filtering the SD-WAN policies based on the updated information associated with the mobile device to generate updated SD-WAN device-specific policies; and
communicating the updated SD-WAN device-specific policies to the mobile device.

18. The one or more computer-readable storage media of claim 15, wherein the SD-WAN policies comprise at least one of the following types of policies:
access policies;
segmentation-based policies;
flow classification policies; or
path selection policies.

19. The one or more computer-readable storage media of claim 15, wherein the information associated with the mobile device further comprises security posture information.

20. The one or more computer-readable storage media of claim 15, wherein:
the SD-WAN policies are received by a virtual routing and forwarding (VRF) enterprise Internet Protocol Security (IPsec) gateway; and
the component of the SD-WAN network is a VRF SD-WAN edge router.

* * * * *